United States Patent Office 3,720,377
Patented Mar. 13, 1973

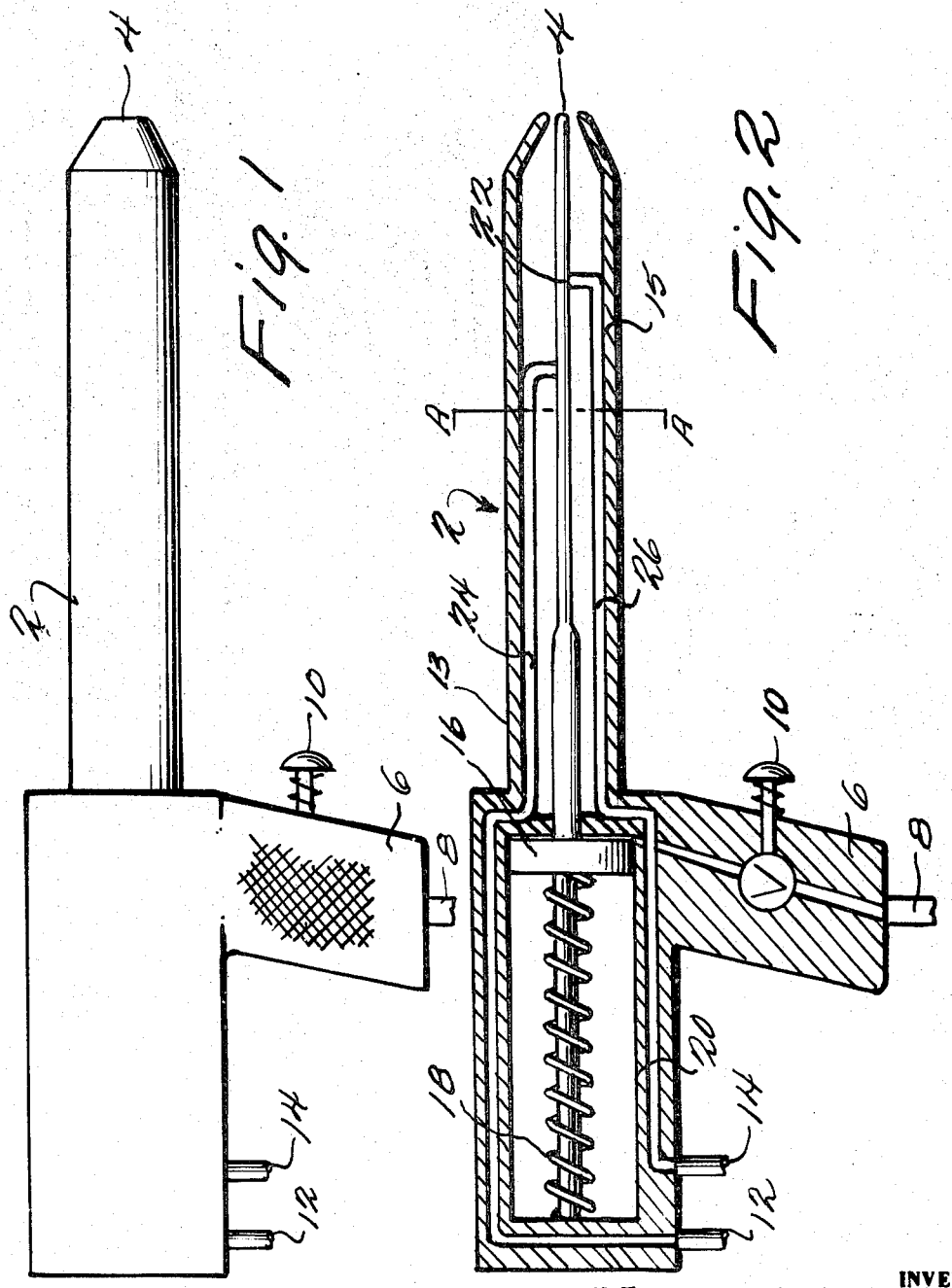

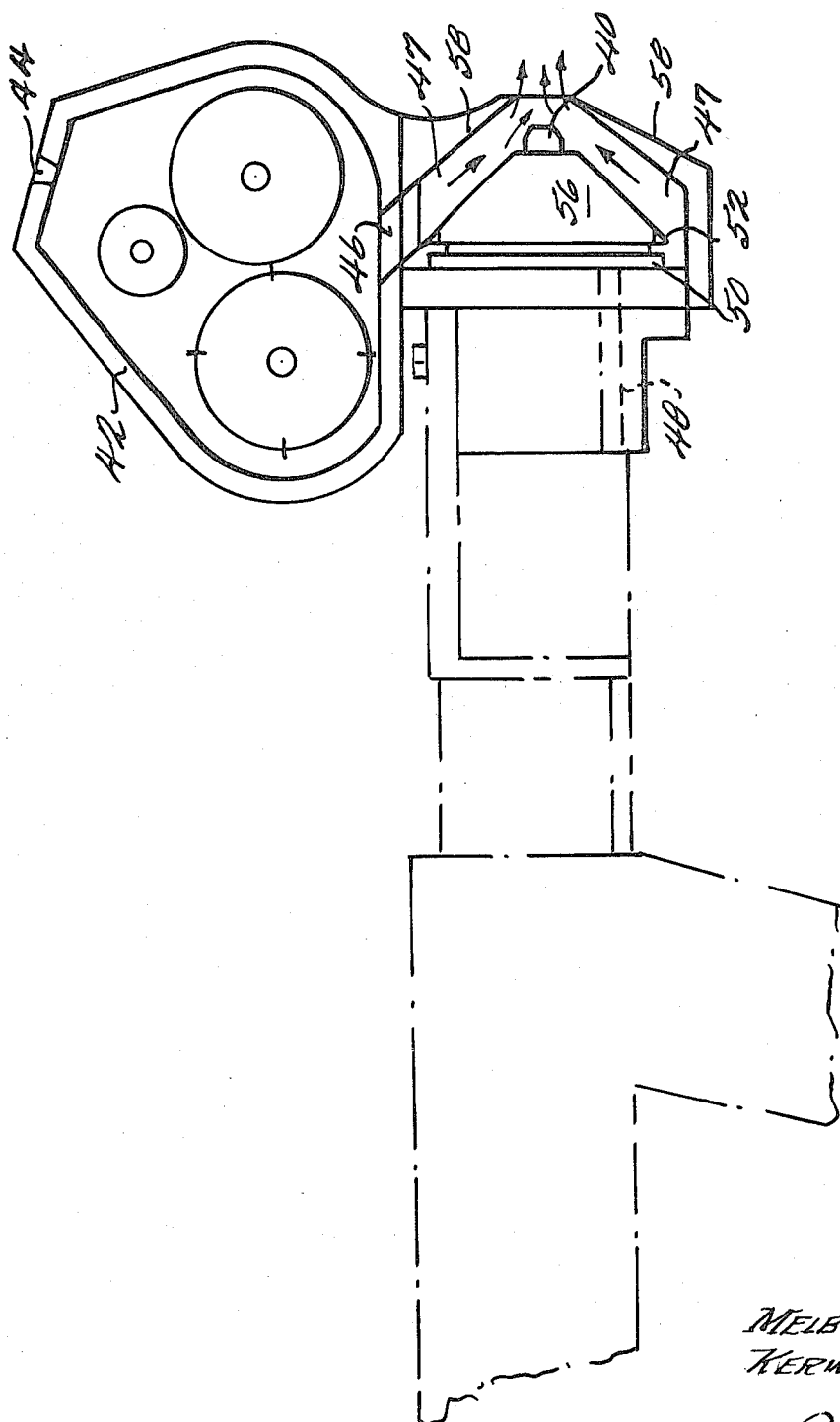

3,720,377
SPRAY GUN
Milburn L. Hart, Tulsa, Okla., and Kerwin E. Meinert, Kansas City, Mo., assignors to Cook Paint & Varnish Company, Kansas City, Mo.
Filed Aug. 26, 1971, Ser. No. 175,161
Int. Cl. B05b 7/14
U.S. Cl. 239—336         2 Claims

ABSTRACT OF THE DISCLOSURE

A foam spray gun comprising a mixing chamber, means for supplying foam-forming components to the chamber and a discharge end for discharging a blend of foam-forming components, a fiber chopper mounted on the gun, adjacent the discharge end thereof, the chopper including an inlet for fibers and a downwardly opening discharge for chopped fibers, a cap member attached to the discharge end and forming an annular, cone-shaped passage around the discharge end, the passage being adapted to receive chopped fibers discharged from the chopper, and means for supplying air into the passage at a point beneath the discharge of fibers thereinto whereby the fibers are introduced essentially annularly into the foam-forming components.

---

The present invention relates to a spray gun which is useful for applying urethane foam.

The application of "spray-in-place" urethane foam is well known and, broadly speaking, involves separately supplying two liquid urethane-foaming components to a proportioning unit where the reactants are heated and then forced through separate heated hoses to a spray gun. Within the gun, the two components are brought together, intimately mixed and propelled onto the surface to be coated. On striking the surface, the sprayed mixture immediately begins to foam and, within seconds, a tack-free formation results. The density of the foam is varied by changing the formulation of the chemical components and the thickness by controlling the speed at which the gun is passed over the target.

Various types of spray guns are available for the purpose referred to above. Generally speaking these comprise a mixing chamber including inlets for supplying the urethane components to the chamber, and a discharge therefrom so as to spray the mixed components, a valving arrangement for supplying the components to the mixing chamber through the inlets thereof and handle means which usually include means for operating the valving arrangement to control the mixing and discharge. Representative of such spray guns are those available from Gusmer Coatings Incorporated (e.g. the Model FF Proportioner).

The principal object of the present invention is to provide certain modifications in spray guns of the type described whereby glass fibers or the like may be chopped and blended into the mixed components just before discharge from the gun. This makes it possible to spray in place blends of urethane foam and glass fibers or the equivalent with resultant increase in the strength and quality of the finished foam.

The invention is described more fully in connection with the accompanying drawings wherein:

FIG. 1 is a perspective view of a typical spray gun without the modification of the invention;

FIG. 2 is a diagrammatic vertical sectional view showing the valve arrangement and associated means for mixing and discharging the foam components; and FIG. 3 is a vertical sectional view of a spray gun of the type shown in FIGS. 1 and 2 but including the modification of the invention and with other parts in essentially diagrammatic form for simplicity.

Referring more specifically to the drawings, the conventional spray gun structure shown in FIGS. 1 and 2 comprises the cylinder member 2 with spray discharge 4 and handle member 6. Air for operating the gun is supplied through handle inlet 8 operated by trigger means 10. One of the urethane components is supplied under pressure through inlet 12 and the other through inlet 14.

Turning now to FIG. 2, air admitted through inlet 8 by operation of means 10 acts against the piston member 16, which is normally pressed forward into an "off" position by spring means 18 within the operating air cylinder 20, and pushes it back (to the left in FIG. 2). This pulls back the valving rod 22, which is an extension of the slidable piston 16, within the casing of the cylinder 2. When the front end of rod 22 reaches position "A," the foam components from 12 and 14, via transverse conduits 13 and 15 are discharged through inlets 24 and 26 into the chamber 28 vacated by the rod. The components are mixed here and sprayed out of the discharge end 4.

The structure shown in FIGS. 1 and 2 is conventional and will be readily understood by those in the art. In FIG. 3, the modification of the invention is shown for feeding chopped fibers into the foam components just before their discharge. According to the invention and as shown in FIG. 3, the gun includes a chopper 42 of generally conventional construction mounted on the gun adjacent the discharge, roving being fed into the chopper at 44 and the chopped fibers being discharged through outlet 46 into the foam spray directly adjacent the gun discharge end 2.

To insure uniform and otherwise proper mixing of the chopped fibers with the foam components discharged at 4, the invention contemplates the provision of a cap member 58 which is screwed or otherwise fitted over the end of the gun. This cap member provides, with the conically shaped discharge member 56 of the gun, an annular passage 47 of generally cone-shaped cross-section, which communicates with the chopper discharge 46. The passage 47 is on about at 45° angle to the horizontal so that the fibers from chopper 42 go into the foam-forming spray adjacent 4 at essentially that angle (45°) for blending just before discharge through the cap member opening 49.

One or more supplement air inlets 48 are provided in the gun as shown in FIG. 3. Such inlet discharges into an annular manifold 50 which is positioned directly behind the conically shaped discharge member 56. The manifold 50 is closed by cap member 49 and the adjacent gun surfaces except for a small air discharge 52 which opens into passage 47 directly beneath the chopper discharge 46. With this arrangement, supplemental air fed in at 48, passes through manifold 50 and discharge 52 and then serves to essentially annularly introduce the fibers into the foam-forming components discharged at 4 just before discharge of the blend from the gun at 49. This arrangement is unique and highly advantageous to insure a uniformly blended mixture of fibers and foam-forming components.

Other modifications and uses of the invention will also be apparent. Hence, the scope of the invention is defined in the following claims.

What is claimed is:

1. A foam spray gun comprising a mixing chamber for mixing together the foam-forming components, means for supplying the foam-forming components to said mixing chamber, and a discharge end for discharging a mixture of said foam-forming components, a fiber chopper mounted on said gun, adjacent the discharge end thereof, said chopper including an inlet for fibers and a downwardly opening discharge for chopped fibers, a cap member attached to said discharge end and forming an annular, cone-shaped passage around said discharge end, said passage being adapted to receive chopped fibers discharged from said chopper, and means for supplying air into said passage at a point beneath the discharge of fibers thereinto whereby said fibers are introduced essentially annularly into said foam-forming components, the means for for supplying said foam-forming components comprising valve means in said mixing chamber for admitting the foam-forming components thereto, a piston member movable within said chamber normally maintaining said valve means closed and fluid means for moving said piston within said chamber to open said valve means and admit said components into the mixing chamber.

2. The spray gun of claim 1 wherein the passage is on a 45° angle with respect to the discharge of fibers thereinto.

References Cited

UNITED STATES PATENTS

| | | | |
|---|---|---|---|
| 3,050,262 | 8/1962 | Curtis | 239—424 X |
| 3,399,834 | 9/1968 | Bradley | 239—336 X |
| 3,185,396 | 5/1965 | Black | 239—336 |

LLOYD L. KING, Primary Examiner

U.S. Cl. X.R.

239—DIG 8